United States Patent [19]
F'Geppert

[11] 3,976,172
[45] Aug. 24, 1976

[54] BRAKE

[75] Inventor: Erwin F'Geppert, Novi, Mich.

[73] Assignee: The United States of America as represented by the Secretary of the Army, Washington, D.C.

[22] Filed: Nov. 22, 1974

[21] Appl. No.: 526,194

[52] U.S. Cl. ............................................. 192/8 R
[51] Int. Cl.² ........................................ B60T 7/12
[58] Field of Search ............................. 192/8 R, 7

[56] References Cited
UNITED STATES PATENTS

| | | | |
|---|---|---|---|
| 945,909 | 1/1910 | Chapman | 192/8 R |
| 1,572,265 | 2/1926 | Bostwick et al. | 192/8 R |
| 1,572,635 | 2/1926 | Bostwick | 192/8 R |
| 2,049,111 | 7/1936 | Dunham | 192/8 R |
| 2,339,232 | 1/1944 | Moroney | 192/8 R |
| 2,873,832 | 2/1959 | Helm | 192/8 R |
| 2,918,275 | 12/1959 | Arlauskas | 192/8 R X |

*Primary Examiner*—Benjamin W. Wyche
*Attorney, Agent, or Firm*—Peter A. Taucher; John E. McRae; Nathan Edelbeg

[57] ABSTRACT

A rotational power-transmitting system which includes brake means automatically operable to prevent transmission of "slip" forces from the driven member to the drive member when the drive member ceases delivering torque to the driven member. The system is preferably two-directional, i.e., the drive member is arranged to move the driven member either forwardly or rearwardly without interference from the brake means.

2 Claims, 4 Drawing Figures

BRAKE

The invention described herein may be manufactured, used, and licensed by or for the Government for governmental purposes without payment to me of any royalty thereon.

BACKGROUND AND SUMMARY OF THE INVENTION

In certain power systems, such as winches or screw jacks, the ultimate load device continually exerts a reaction loading force on the driven member; when the drive member ceases delivering drive torque to the driven member, the unopposed reaction force causes the driven member to free wheel backwardly from the position to which it had been moved by the drive member.

The present invention proposes a novel brake means that automatically locks the driven member in any position to which it has been moved by the drive member. In one of its embodiments, the brake means comprises at least one pawl carried by the driven member for interaction with a stationary annular toothed surface. While the drive member is exerting drive torque on the driven member the pawl trips across or around the annular toothed surface; when the drive member ceases delivering drive torque to the driven member, the pawl drops into one of the tooth spaces to lock the driven member against the unopposed free-wheeling reaction forces exerted by the load.

In a preferred two-directional arrangement, two pawls are used. One pawl operates as a locking device to resist clockwise reaction forces; the other pawl resists counterclockwise reaction forces. The drive member has a lost motion connection with the driven member for enabling the driven member to unlock the pawls preparatory to initial force transmission to the driven member.

THE DRAWINGS

FIGS. 1 AND 2

Figure 2:
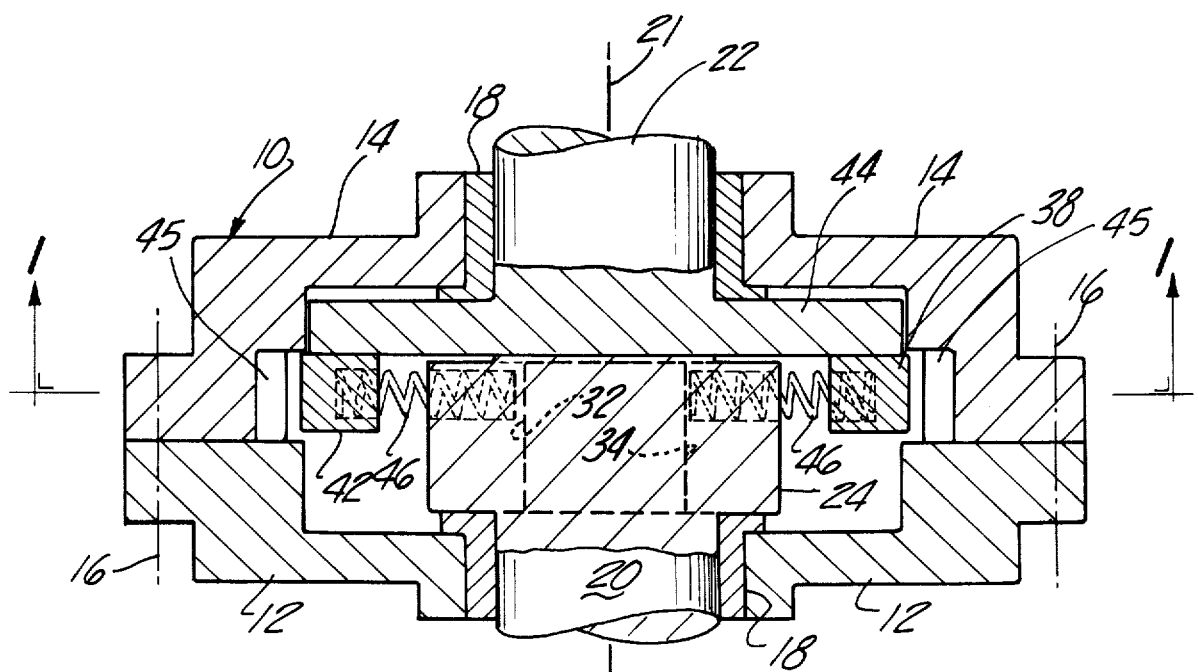
FIG. 2 is a sectional view taken on line 2—2 in FIG. 1.

There is shown a two-directional power-transmitting system comprising a stationary housing 10 defined by two housing elements 12 and 14 suitably bolted together by conventional bolts located at spaced points around the housing periphery; two of the bolt centerlines are denoted by numerals 16 in FIG. 2.

Suitable bearings 18 are disposed within the housing for rotational support of a drive input shaft 20 and driven output shaft 22. Shaft 20 carries a disk 24 having an outline configuration defining two cam surfaces 28 and 30, and two abutment surfaces 32 and 34. Driven shaft 22 carries a circular disk 44. The shafts are arranged for rotational movement around a common axis 21.

Figure 1:
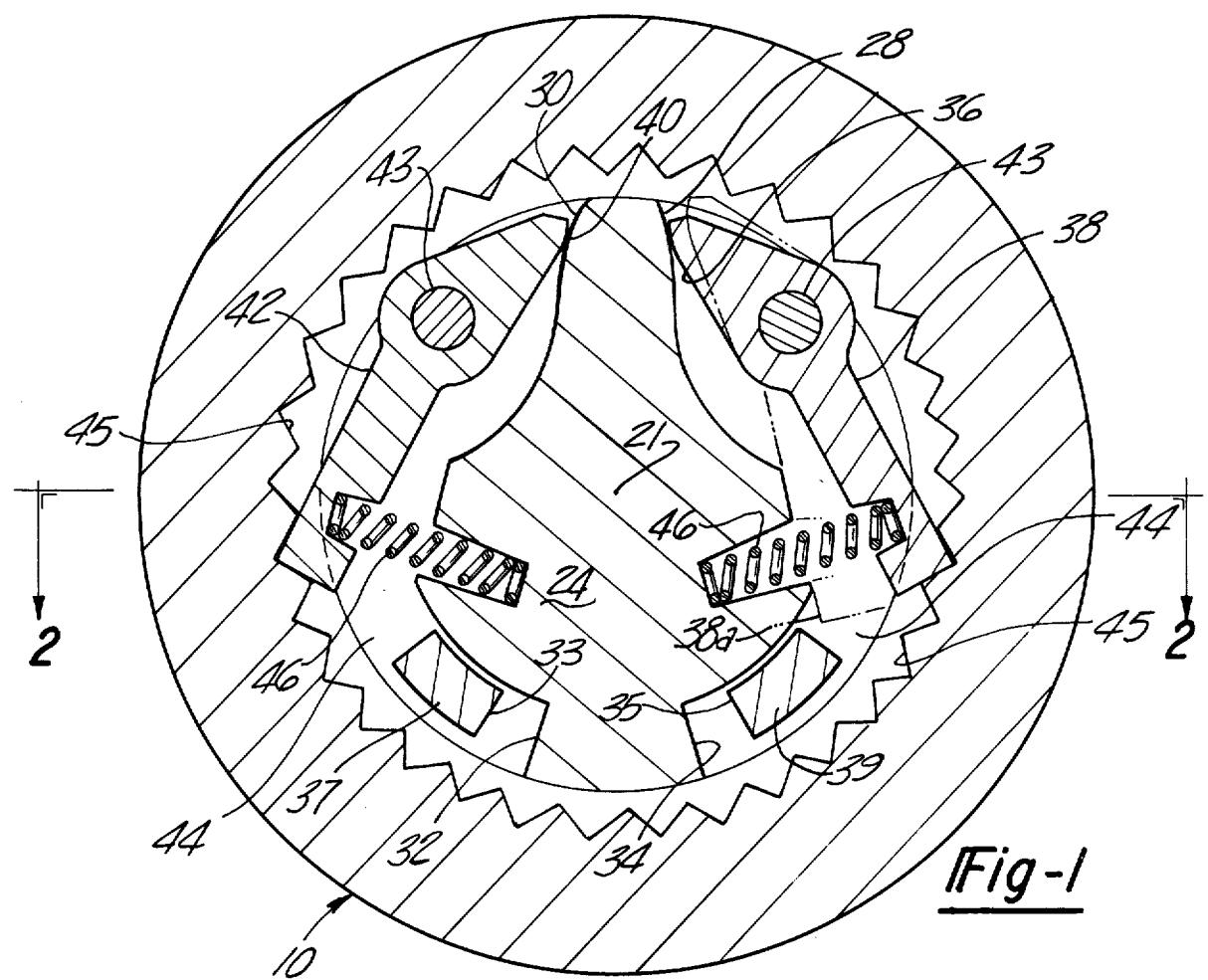
FIG. 1 is a transverse sectional view of one embodiment of the invention taken on line 1—1 in FIG. 2.

As seen in FIG. 1, abutment surfaces 32 and 34 are rotationally spaced from abutment surface 33 and 35 formed on the axially projecting lug portions 37 and 39 of the output disk 44. Lugs 37 and 39 are not visible in FIG. 2.

When drive shaft 20 is powered clockwise by an electric motor or other power means (not shown), abutment surface 32 forcibly strikes abutment surface 33, thereby transmitting clockwise rotational force to disk 44 and driven shaft 22. When drive shaft 20 is powered counterclockwise, abutment surface 34 forcibly strikes abutment surface 35, thereby effecting counterclockwise movement of disk 44 and driven shaft 22. Surfaces 32 and 34 are spaced from surfaces 33 and 35 so that power transmission is delayed for a period of time sufficient to enable cam surfaces 28 and 30 to move pawls 38 and 42 out of locking engagement with tooth surfaces 45 that extend annularly around the inner periphery of housing 10. Cam surfaces 28 and 30 in effect constitute force elements movable by the drive member for retracting the brake elements 38 and 42 away from stationary locking surface 45.

Cam surface 28 engages a cam follower surface 36 formed on pawl 38. Cam surface 30 engages a cam follower surface 40 formed on pawl 42. Each pawl is swingably mounted on a pin 43 extending from disk 44 carried by the driven shaft 22.

Each pawl 38 or 42 constitutes a brake element for locking output member 22 against rotational movement when the input member 20 is not delivering torque to the output member. The pawls are oriented so that pawl 38 locks driven disk 44 against clockwise rotation, and pawl 42 locks disk 44 against counterclockwise rotation relative to stationary housing 10. The two pawls cooperatively prevent movement of driven shaft 22 by the load in either direction.

Each pawl is biased to its locked position by means of a compression spring 46 seated in tapered sockets formed in member 24 and the respective pawl. In the absence of torque input from the prime mover, the springs will move both pawls to the FIG. 1 locked positions; as an incidental event the disk 24 will be centered with respect to the lugs 37 and 39, i.e., the spacing between surfaces 32 and 33 will equal the spacing between surfaces 34 and 35.

Pawls 38 and 42 are related to drive disk 24 so that initial movement of that disk by the prime mover produces a disengagement or unlocking movement of one of the pawls, thereby enabling the driven member to be freed for movement in the desired direction (clockwise or counterclockwise). One direction may be considered "forward", and the other direction considered "reverse".

Assuming the prime mover initially moves drive disk 24 clockwise, cam surface 28 forces pawl 38 to move clockwise about its pin 43, to the dotted line position 38a; in such a position, the pawl is disengaged from toothed surface 45 so that disk 44 can be moved by engagement of abutment surfaces 32 and 33. The initial spacing of surfaces 32 and 33 is selected so that pawl 38 is retracted from tooth surface 45 before surface 32 strikes surface 33. After surface 32 forcibly engages surface 33, the drive shaft 20 and driven shaft 22 rotate together. Pawl 38 is clear of teeth 45; pawl 42 is enabled to trip across the teeth (assuming clockwise movement) because its cam follower surface 40 is then spaced from cam surface 30.

When the prime mover ceases delivering torque to drive shaft 20, the load on driven shaft 22 is unopposed. Consequently, the load will tend to move shaft 22 counterclockwise. However, pawl 42 will then engage one of teeth 45 to prevent counterclockwise movement of disk 44 and the attached shaft 22. Springs 46 will then center drive disk 24 relative to lugs 37 and 39, thereby resetting the mechanism for movement by the prime mover (clockwise or counterclockwise).

The action during counterclockwise torque input is similar to that previously described (except that pawl 42 is the "freed" pawl and pawl 38 is the trippable pawl). During initial torque input in the counterclockwise direction cam surface 30 forces pawl 42 to retract from toothed surface 45; thereafter, abutment surface 34 strikes surface 35 to transmit rotational force to the driven disk 44. When the prime mover no longer delivers input torque to disk 24, the load reverse the direction of driven disk 44 until pawl 38 drops into the nearest tooth 45. The reverse movement is limited to less than a one-tooth distance.

FIGS. 3 AND 4

Figure 3:
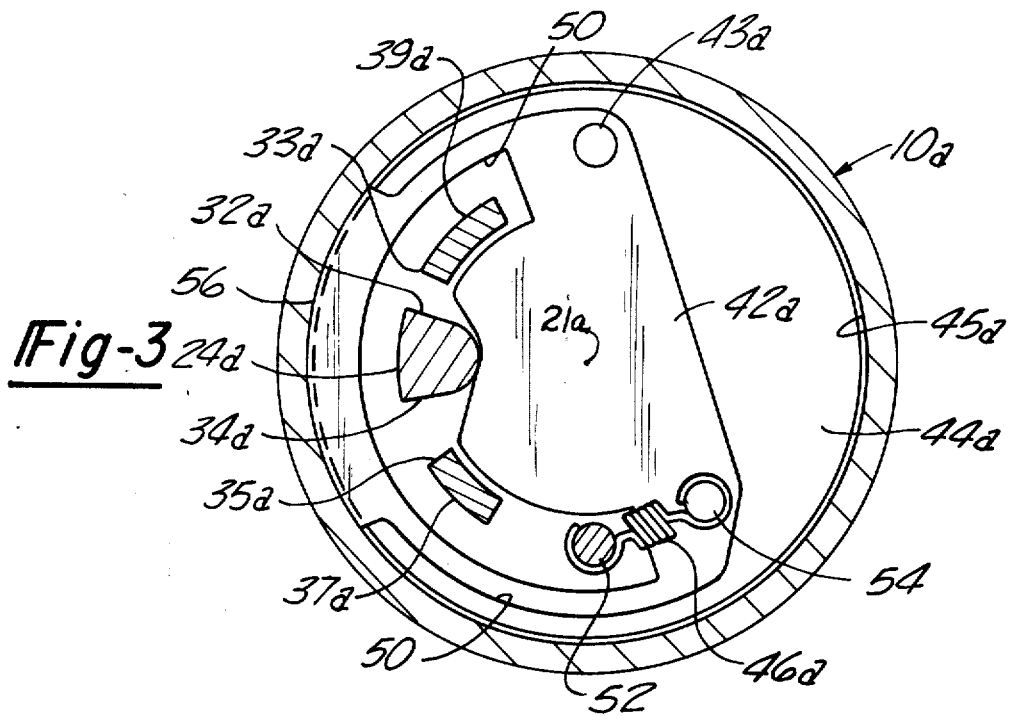
FIG. 3 is a transverse sectional view taken through another embodiment of the invention.
Figure 4:
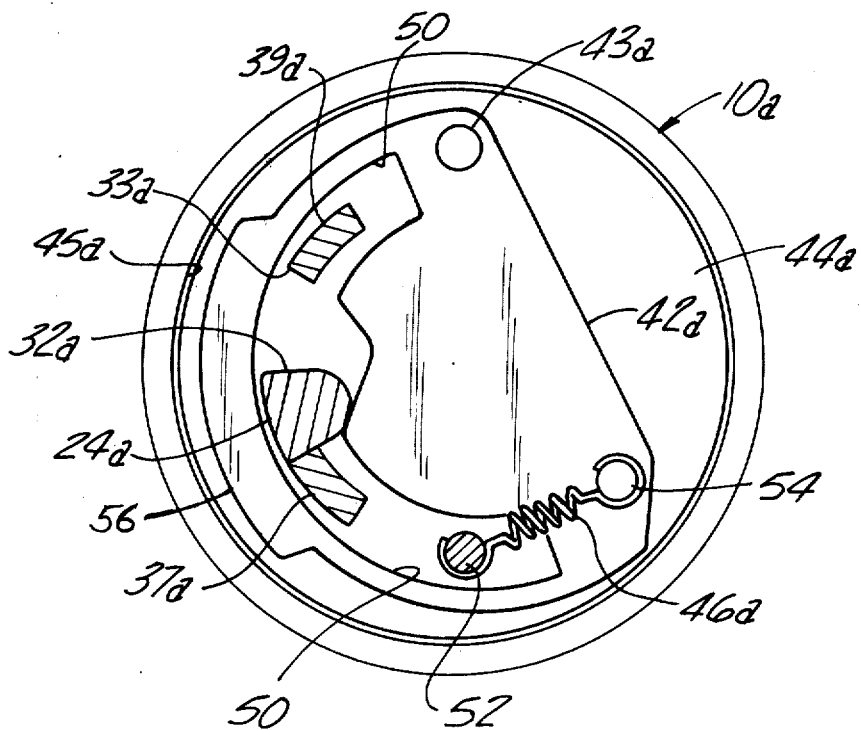
FIG. 4 is a view on the same plane as FIG. 3, but in a different operating condition.

FIG. 3 illustrates in a diagrammatic fashion, an alternate embodiment of the invention when in the "braked" position. FIG. 4 illustrates the mechanism during a period of counterclockwise movement. This embodiment uses a friction brake in lieu of the positive lock type brake shown in FIG. 1. The FIG. 1 embodiment represents a preferred arrangement, especially for high load situations where dangerous forces could be generated by high speed free wheeling of the driven member.

As seen in FIG. 3, the stationary housing 10a defines a reaction surface 45a around its inner periphery. The drive member includes a drive lug 24a movable around the central axis 21a and having oppositely facing drive surfaces 32a and 34a. The actual drive (input) shaft is not visible in the drawings, but could be similar to shaft 20 of FIG. 2.

The driven (output) member includes a circular disk 44a suitably connected to a non-illustrated shaft located on the central axis 21a. Disk 44a is provided with a pin 43a that swingably mounts a brake element 42a. A slot 50 is element 42a accommodates drive lug 24a, as well as two driven (output) lugs 37a and 39a extending from disk 44a.

Disk 44a mounts a pin 52 that anchors one end of a tension spring 46a. The other end of the tension spring is anchored to a pin 54 extending from brake element 42a. In the FIG. 3 position, spring 46a is effective to bias brake element 42a into frictional locking engagement with stationary reaction surface 45a, thereby precluding movement of disc 44a (clockwise or counterclockwise).

Slot 50 is configured to provide two cam follower surfaces 36a and 40a. These surfaces unlock the brake element in response to initial movement of the drive member 24a by the prime mover. Assuming that a counterclockwise input torque is applied to member 24a, that member will move from the FIG. 3 position towards the FIG. 4 position, thereby retracting brake element 42a away from stationary reaction surface 45a. As soon as driver surface 34a strikes lug surface 35a, the output member 44a begins rotating in the counterclockwise direction.

When input driving torque to member 24a ceases spring 46a produces a force tending to rotate the component mechanisms to the FIG. 3 braked condition. Thus, spring tension will cause cam follower surface 40a to exert a clockwise force on drive member 24a, thereby moving same to the FIG. 3 position. Movement of brake element 42a is exaggerated in the drawings to illustrate the operation. Actual movement of the brake element toward or away from stationary surface 45a could in practice be quite small, sufficient only to release or apply the friction force and compensate for wear of friction surface 56.

Operation of the mechanism to produce clockwise movement of the output driven member 44a is essentially the same as described above except that lug 39a constitutes the operating connection between the drive and driven members. Spring 46a biases the brake element to the braked position in response to cessation of input torque irrespective of the movement direction at the time of torque input cessation.

FEATURES OF THE INVENTION

The invention seeks to provide a low-cost brake that automatically stops and holds the driven member whenever the drive member ceses to be moved by the prime mover. Thus, loading forces tending to free wheel the driven member at dangerously high speeds are prevented. The brake is quick-acting in the sense that it goes into operation immediately when the drive member is de-energized; therefore, the brake is in the engaged position before dangerous inertia effects can take place. Also, the brake is a relatively precise device in that it holds the driven member almost exactly where that member may be when the drive member is de-energized.

A feature of the brake is that it offers essentially no obstruction to powered movement of that drive member in either direction. Thus, in the FIG. 1 embodiment, the brake elements 38 and 42 are automatically disengaged from the stationary locking surface 45 whether the drive member is moving clockwise or counterclockwise. Similarly, in the FIG. 3 embodiment, brake element 42a is automatically disengaged irrespective of the direction taken by powdered member 24a. However, if the system requires movement of the load only in one direction (e.g., clockwise), the brake will still operate; in that event, one of the pawls (38 or 42 in FIG. 1) could be omitted.

The illustrated embodiments of the invention depend on the presence of a lost motion connection between the drive and driven members in order to disengage the brake from the stationary locking surface 45 or 45a. In the device of FIG. 1, the lost motion connection is provided by the spacing between surfaces 32 and 33 and/or 34 and 35. In the device of FIG. 3, the lost motion connection is provided by the spacing of drive member 24a from the driven lugs 37a and 39a.

The described lost motion connections permit the cam surfaces on the drive member to disengage the brake before the drive member begins to transmit power to the driven member. It is believed that the drive mechanism is relatively fail-safe or jam-free, since the sequence of events (brake-disengagement and power transmission) is controlled by a single element (the drive member).

I wish it to be understood that I do not desire to be limited to the exact details of construction shown and described, for obvious modifications will occur to a person skilled in the art.

I claim:

1. In a rotary power transmitting system: a stationary reaction annulus having internal teeth therearound; a rotatable drive member concentric with said annulus; a rotatable driven member axially aligned with the drive member; a pawl swingably mounted on the driven member for movement toward and away from the reaction teeth; a driver surface located on the drive member to rotate around the drive member axis, an abutment located on said driven member in the path of the drive member surface so that power transmission takes place only when the driver surface is forcibly engaged with the abutment; a cam surface located on the drive member remote from the driver surface, and a cooperating follower surface located on the pawl, whereby initial rotary movement of the drive member causes the cam surface to exert pressure on the follower surface for thus swinging the pawl out of engagement with the associated reaction teeth; said abutment being oriented to the pawl and driver surface so that the driver surface forcibly engages the abutment only after the pawl has been disengaged from the reaction teeth; and spring means yieldably trained between the drive member and pawl so that the pawl is biased toward a condition engaged with the reaction teeth and cam surface, whereby when the drive member is put in a non-powered condition the spring means moves the pawl into engagement with the teeth and also moves the drive member so that the driver surface is spaced from the abutment; the swing axis of the pawl located so that the tooth-engaging surface of the pawl moves generally parallel to the load surfaces of the reaction teeth during movement of the pawl toward and away from the teeth.

2. The system of claim 1 and further comprising a second pawl swingably mounted on the driven member for movement toward and away from the reaction teeth; a second driver surface located on the drive member to rotate around the drive member axis, a second abutment located on the driven member in the path of the second driver surface; a second cam surface located on the drive member, and a second cooperating follower surface located on the pawl, whereby initially reverse rotary movement of the drive member causes the second cam surface to exert pressure on the second follower surface for thus swinging the second pawl out of engagement with the associated reaction; said second abutment being located so that the second driver surface forcibly engages the second abutment only after the second pawl has been disengaged from the reaction teeth; and second spring means yieldably trained between the driver member and second pawl for biasing the second pawl toward a condition engaged with the reaction teeth; the first and second spring means exerting oppositely acting forces on the driver member to thus equalize the abutment-driver surface spacings when both pawls are engaged with the reaction teeth; the swing axis of the second pawl being located so that the tooth-engaging surface of the second pawl moves generally parallel to the load surfaces of the reaction teeth during movement of the second pawl toward and away from the teeth.

* * * * *